United States Patent
Jain et al.

(10) Patent No.: US 9,747,575 B2
(45) Date of Patent: Aug. 29, 2017

(54) FLOW METERING OF VEHICLES USING RTLS TRACKING

(75) Inventors: Sandeep Jain, Mountain View, CA (US); Nadia Onorati, Marysville, MI (US); David Phillips, Marysville, MI (US)

(73) Assignee: ZIH Corp., Lincolnshire, IL (US)

( * ) Notice: Subject to any disclaimer, the term of this patent is extended or adjusted under 35 U.S.C. 154(b) by 2645 days.

(21) Appl. No.: 12/103,386

(22) Filed: Apr. 15, 2008

(65) Prior Publication Data

US 2008/0262885 A1 Oct. 23, 2008

Related U.S. Application Data

(60) Provisional application No. 60/912,210, filed on Apr. 17, 2007.

(51) Int. Cl.
*G06Q 10/08* (2012.01)
*G06Q 10/06* (2012.01)

(52) U.S. Cl.
CPC ......... *G06Q 10/08* (2013.01); *G06Q 10/0633* (2013.01); *G06Q 10/087* (2013.01)

(58) Field of Classification Search
CPC ... G06Q 10/08; G06Q 10/0633; G06Q 10/087
See application file for complete search history.

(56) References Cited

U.S. PATENT DOCUMENTS

| | | | |
|---|---|---|---|
| 5,074,706 A | 12/1991 | Paulos | 404/12 |
| 5,604,715 A | 2/1997 | Aman et al. | 367/118 |
| 5,920,287 A | 7/1999 | Belcher et al. | 342/450 |
| 5,995,046 A | 11/1999 | Belcher et al. | 342/450 |
| 6,026,378 A | 2/2000 | Onozaki | 705/28 |
| 6,121,926 A | 9/2000 | Belcher et al. | 342/450 |
| 6,127,976 A | 10/2000 | Boyd et al. | 342/463 |
| 6,268,723 B1 | 7/2001 | Hash et al. | 324/243 |
| 6,317,082 B1 | 11/2001 | Bacon et al. | 342/465 |
| 6,356,802 B1 | 3/2002 | Takehara et al. | 700/215 |

(Continued)

OTHER PUBLICATIONS

ISO.org International Standards for Business, Government and Society. Information technology—Real-time locating systems (RTLS)—Part 1: Application program interface (API). ISO/IEC 24730-1:2006. Document available as of: Feb. 15, 2006, 4 pages.*
Molisch et al., "*MIMO Systems With Antenna Selection—An Overview*," Mar. 2004, pp. 1-18.

(Continued)

*Primary Examiner* — H Rojas

(57) ABSTRACT

A system and method optimizes throughput of tracked assets as work-in-progress (WIP) within a monitored environment such as a manufacturing establishment with off-line processing areas. A plurality of assets such as vehicles have a tag transmitter associated therewith and operative for transmitting a wireless RF signal that includes data relating to the identification of the asset to which the tag transmitter is associated. A real-time location system (RTLS) infrastructure tracks the location of the plurality of assets to various containment, staging, and processing task areas within the monitored environment as WIP. A processor is operative with the RTLS infrastructure for determining an asset input rate into WIP at an origin to the WIP for optimizing asset flow rate as WIP through different containment, staging, and processing areas within the monitored environment.

20 Claims, 11 Drawing Sheets

| | V1 | RAMP (5) | WHEEL (3) | ELECTRONICS (3) | LEATHER (2) |
|---|---|---|---|---|---|
| | | ETA: 1:15<br>ETD: 2:00 | | ETA: 2:05<br>ETD: 2:50 | ETA: 2:55<br>ETD: 4:00 |
| W I P | VEHICLE 1 (V1) | ETA: 1:15<br>ETD: 2:15 | ETA: 2:20<br>ETD: 2:30 | ETA: 2:35<br>ETD: 3:00 | |
| | VEHICLE 2 (V2) | | ETA: 2:20<br>ETD: 2:30 | | ETA: 2:35<br>ETD: 3:35 |
| | VEHICLE 3 (V3) | ETA: 2:50<br>ETD: 3:20 | | | ETA: 3:25<br>ETD: 4:10 |

(56) References Cited

U.S. PATENT DOCUMENTS

| | | | |
|---|---|---|---|
| 6,380,894 B1 | 4/2002 | Boyd et al. | 342/450 |
| 6,433,750 B1 | 8/2002 | Sugita | 343/713 |
| 6,434,194 B1 | 8/2002 | Eisenberg et al. | 375/238 |
| 6,476,719 B2 | 11/2002 | Belcher et al. | 340/572.1 |
| 6,502,005 B1 | 12/2002 | Wrubel et al. | 700/116 |
| 6,577,246 B1 | 6/2003 | Handa et al. | 340/901 |
| 6,577,921 B1 | 6/2003 | Carson | 700/214 |
| 6,593,885 B2 | 7/2003 | Wisherd et al. | 342/463 |
| 6,655,582 B2 | 12/2003 | Wohl et al. | 235/380 |
| 6,657,586 B2 | 12/2003 | Turner | 342/357.07 |
| 6,665,585 B2 | 12/2003 | Kawase | 700/226 |
| 6,728,629 B2 | 4/2004 | Oka et al. | 701/200 |
| 6,774,817 B2 | 8/2004 | Tanji et al. | 340/933 |
| 6,812,839 B1 | 11/2004 | Belcher et al. | 340/572.1 |
| 6,853,687 B2 | 2/2005 | Harrington et al. | 375/259 |
| 6,859,485 B2 | 2/2005 | Belcher | 375/130 |
| 6,892,054 B2 | 5/2005 | Belcher et al. | 455/63.1 |
| 2002/0070891 A1 | 6/2002 | Huston et al. | 342/357.09 |
| 2002/0077710 A1 | 6/2002 | Harrington et al. | |
| 2002/0094012 A1 | 7/2002 | Belcher | 375/130 |
| 2002/0104879 A1 | 8/2002 | Wohl et al. | 235/380 |
| 2002/0135479 A1* | 9/2002 | Belcher et al. | 340/572.1 |
| 2002/0181565 A1 | 12/2002 | Boyd et al. | 375/152 |
| 2003/0137968 A1 | 7/2003 | Lareau et al. | 370/349 |
| 2003/0158618 A1* | 8/2003 | Browning | 700/99 |
| 2003/0191555 A1 | 10/2003 | Takehara et al. | 700/215 |
| 2004/0102870 A1 | 5/2004 | Andersen et al. | 700/215 |
| 2004/0249557 A1 | 12/2004 | Harrington et al. | 701/115 |
| 2005/0185618 A1* | 8/2005 | Friday et al. | 370/331 |
| 2006/0220851 A1 | 10/2006 | Wisherd | 340/568.1 |
| 2007/0182556 A1 | 8/2007 | Rado | 340/572.1 |
| 2007/0223996 A1 | 9/2007 | Green et al. | 404/9 |
| 2007/0252728 A1 | 11/2007 | Wisherd et al. | 340/933 |

OTHER PUBLICATIONS

"*Position Tracking Interface Unit (PTIU) for RTG's*,"Paceco Corp., www.pacecocorp.com, pp. 1-6.
Jorichs, Von Hartmut, "*Neue Systeme zur Steuerung von Flurforderzeugen*," Technische Rundschau, Jan. 6, 1989, pp. 34-39.
"Wherenet Introduces Wireless Locations Solution for Marine Terminals," Online, Oct. 21, 2003, www.wherenet.com/pressreleases/pr_10212003.html, 2 pages.
"Dockside Cranes Get Brains," RFID Journal, Online, Oct. 29, 2003, www.rfidjournal.com/article/articleview/630/1/17, 2 pages.
"WhereLan," Online, 2003, www.wherenet.com/pdfs/wherelan%204.9.04.pdf, 1 page.
"WhereTag III," Online, 2003, www.wherenet.com/pdfs/wheretag%20III.5.3.0.pdf, 1 page.
"WherePort III," Online, 2003, www.wherenet.com/pdfs/whereport.10.1.0.pdf, 2 pages.
Bratukhin, A; Treytl, A., "Applicability of RFID and Agent-Based Control for Product Identification in Distributed Production," *Emerging Technologies and Factory Automation*, 2006. ETFA '06. IEEE Conference on, vol., no., pp. 1198, 1205, Sep. 20-22, 2006.
Mills-Harris, M.D.; Soylemezoglu, A.; Saygin, C., "RFID data-based inventory management of time-sensitive materiasl," *Industrial Electronics Society*, 2005. IECON 2005. 31st Annual Conference of IEEE, vol., no., pp. 6 pp.,, Nov. 6-10, 2005.
Wang, Zhi-Guo; Tang, Ren-zhong; Sheng, Wen-Iu; Wang, Guo-dong, "Research on RFID-based production logistics management techniques with application in garment industry," *Technology and Innovation Conference*, 2006. ITIC 2006. International, vol., no., pp. 383,387, Nov. 6-7, 2006.
Office Action from German Patent Application No. 112008000709.8-53, dated Apr. 22, 2015.
International Search Report and Written Opinion from International Patent Application No. PCT/US2008/004946 dated Aug. 8, 2008.
Office Action from German Patent Application No. 11 2008 000 709.8, dated Jun. 28, 2012.

* cited by examiner

FLOW METERING OF VEHICLES USING RTLS TRACKING

RELATED APPLICATION

This application is based upon prior titled provisional application Ser. No. 60/912,210 filed Apr. 17, 2007.

FIELD OF THE INVENTION

The present invention relates to work flow metering such as used for vehicle tracking and management systems.

BACKGROUND OF THE INVENTION

A vehicle tracking and management system automates vehicle tracking in a vehicle assembly, delivery chain, or fleet operations and automates the tracking and managing of vehicles indoors and outdoors within a campus or facility-wide environment within the various stages that a vehicle travels as it moves from a point-of-manufacture such as off-line assembly areas at a factory to the consumer. The vehicle throughput through off-line processing is increased with an associated improvement in labor productivity and a reduced dwell time of vehicle inventories.

A real-time location system (RTLS) is typically used for tracking vehicles to maintain control over the automated vehicle tracking and management such that wherever the vehicle is located within the assembly area, off-line area, shipping yard, railroad mixing center, marine terminal mixing center, truck distribution center, vehicle outfitting center, or dealership, the vehicle can be located and tracked. A vehicle can be located from initial assembly in a facility to different areas in the delivery chain. These are areas in which vehicles are held in containment and in different staging and processing areas. Vehicle processing can vary in these areas, however. For example, a car wash may only be able to process one vehicle per minute, but a shipping yard, railroad mixing center, or marine terminal mixing center could possibly process five or more vehicles per minute. In some of the staging and processing areas, this difference may force some vehicles into another containment area, forming an excess, accessorized inventory. Usually, the processing task areas work as fast as possible without consideration for bottlenecks down the line, causing containment build-up. Because the overflow cannot be addressed within the work-in-progress (WIP), some type of control should be exercised.

SUMMARY OF THE INVENTION

A system and method optimizes throughput of tracked assets as work-in-progress (WIP) within a monitored environment such as a manufacturing establishment with off-line processing areas. A plurality of assets such as vehicles have a tag transmitter associated therewith and operative for transmitting a wireless RF signal that includes data relating to the identification of the asset to which the tag transmitter is associated. A real time location system (RTLS) infrastructure tracks the location of the plurality of assets to various containment, staging, and processing task areas within the monitored environment as WIP. A processor is operative with the RTLS infrastructure for determining an asset input rate into WIP at an origin to the WIP for optimizing asset flow rate as WIP through different containment, staging, and processing areas within the monitored environment.

The assets could be formed as vehicles and the monitored environment includes various containment, staging, and processing task areas through which the vehicles pass. The RTLS infrastructure can include a plurality of spaced access points positioned at known locations within the monitored environment that receive wireless RF signals from tag transmitters and a processor for geolocating each asset. The processor is operative for correlating a signal as a first-to-arrive signal and conducting differentiation of first-to-arrive signals to locate an asset. This RTLS infrastructure can be operative for processing RF signals including signals compatible with ISO 24730 and WiFi systems.

In yet another aspect, the processor is operative for determining an asset input rate into WIP based upon predictive metering that determines asset availability in staging or processing task areas. The processor can be operative for estimating a time of arrival (ETA) of an asset to each processing task area and determining whether there is availability within a staging area or processing task area. The processor is also operative for estimating a time of departure (ETD) for each asset from a staging area depending on task completion or move completion of assets.

In yet another aspect, the processor is operative for determining an asset input rate into WIP based upon rate control metering that identifies the number of assets waiting in staging and containment areas for processing task areas to determine minimum and maximum thresholds for each staging and containment area and based upon an asset overflow, moving assets into WIP. If a number of assets cross thresholds within a staging or containment area, the processor is operative for determining a delay input for completing a task within a task processing area.

A method aspect is also set forth.

BRIEF DESCRIPTION OF THE DRAWINGS

Other objects, features and advantages will become apparent from the detailed description which follows, when considered in light of the accompanying drawings in which.

DETAILED DESCRIPTION OF THE PREFERRED EMBODIMENTS

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

Flow metering is incorporated with a vehicle tracking and management system (VTMS) in accordance with one non-limiting example such as for optimizing process control for vehicles processed through various containment, staging, and process areas as in a manufacturing establishment, e.g., off-line from assembly as explained below. The system and method uses a real-time locating system (RTLS) and task execution data to determine available capacity of process task areas before injecting new vehicles (or other inventoried items and articles that can be flow optimized) into the work-in-progress (WIP) supply chain. The description will proceed with reference to vehicles, but it should be understood that many different types of assets as articles or tracked items can be metered and flow optimized using the system and method in accordance with a non-limiting example. The VTMS approach generates rule-based, move requests for customers to move vehicles into WIP. Excess inventory that has been partially processed is reduced and blocked from onward processing due to bottlenecks in the chain.

In accordance with non-limiting examples, it is possible to implement a predictive metering model or a rate control metering model, each sometimes alternatively referred to as predictive metering and rate control metering. A predictive metering model considers all the remaining tasks of all the vehicles in WIP, and looks at the task plan of a vehicle to be injected into the supply chain, to determine whether physical space is available in the future. If not, the vehicle is not injected into the supply chain.

A rate control metering model considers only problem areas, where overflow and blockage reaches a certain threshold. Using rate control metering, the system moderates the rate of injection for vehicles that are going to those areas by the overflow rate. This approach requires the use of the tracking algorithm of RTLS (rather than task execution) and the use of the task plan for the vehicle being considered for injection into the WIP/supply-chain.

Of course, those skilled in the art will appreciate that the system and method as described extends beyond VTMS applications. The system and method described herein may also be used for any general application for asset metering or flow optimization using RTLS tracking, which is independent of RF signal type, for example, ISO+24730, WiFi, CSS, UWB, and similar protocols and signals, as will also be appreciated by those skilled in the art.

Figure 1:
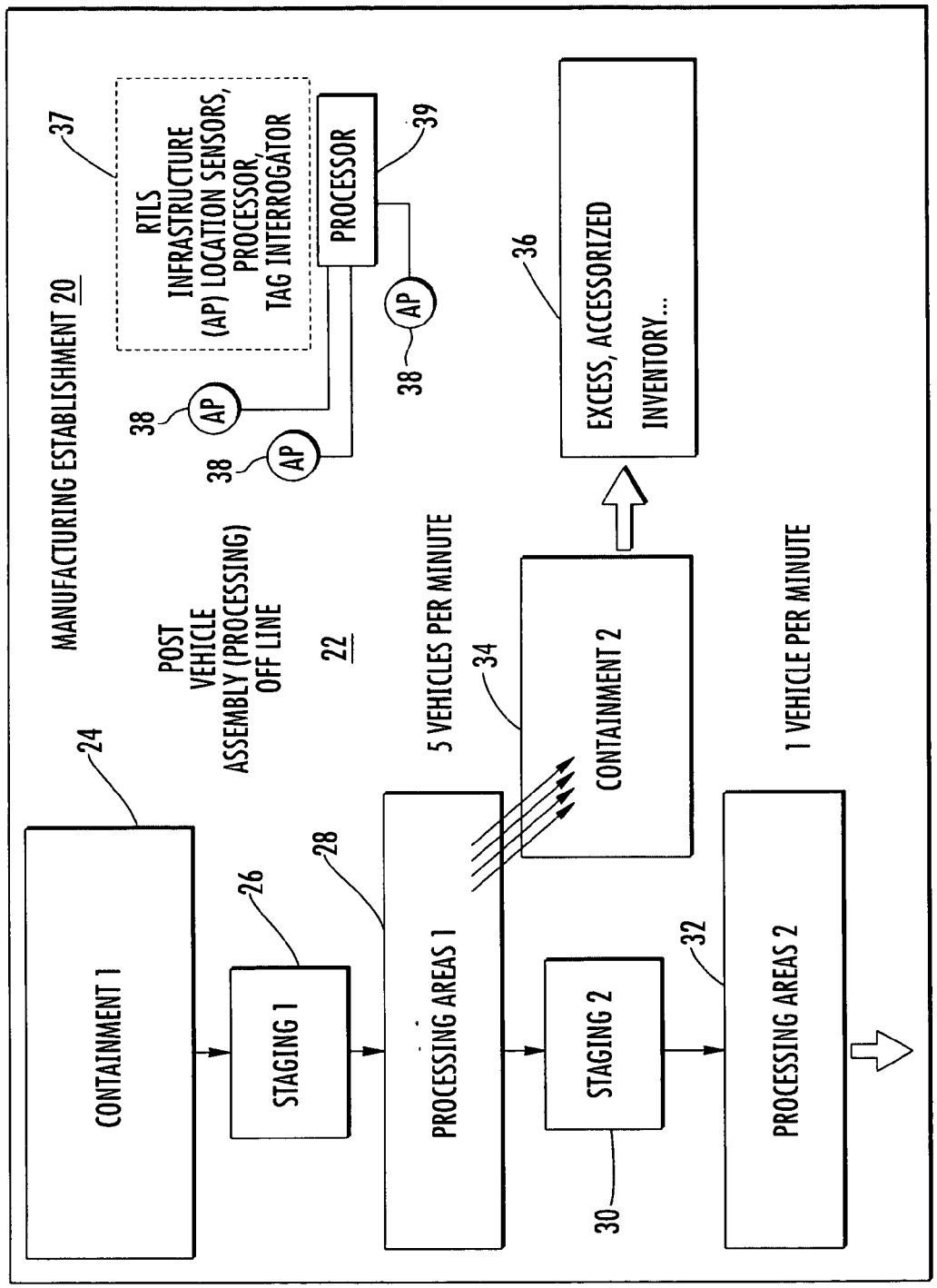
FIG. 1 is a block diagram showing a manufacturing establishment with post vehicle assembly and processing off-line and showing various containment, staging, and processing areas with excess, accessorized inventory in accordance with a non-limiting example.

FIG. 1 shows an example of a manufacturing establishment indicated at 20 and having a processing line 22 such as a vehicle manufacturing post assembly line in a work flow area. Vehicles or other articles to be processed carry tag transmitters for location determination as explained in greater detail below. The manufacturing establishment can include outdoor yards, buildings, and various areas for post assembly processing. A containment area 24 noted as Containment 1 is shown and a first staging area 26 for the vehicles or other inventoried items is followed by a first processing area 28. This processing area 28 processes vehicles in some manner at about five vehicles per minute in one non-limiting example. For example, the first processing area 28 could be an electronics assembly point or some other aspect on a post production line or process flow. The processing area 28 is followed by a second staging area 30 and a second processing area 32 that could process vehicles at about one vehicle per minute. This processing area 32 could be a more labor or time intensive staging area. Because the first processing area 28 may include a greater number of vehicles, a second containment area 34 receives vehicles, and as a result, it is possible that an excess, accessorized vehicle inventory 36 is established. Thus, the processed task areas work as fast as possible without consideration for bottlenecks down the line, causing containment build-up as illustrated. Flow metering in accordance with non-limiting examples is advantageous because the overflow cannot be addressed within the work-in-progress (WIP) and control is exercised at this source as a pre-WIP. Metering establishes a dynamic, vehicle input rate into WIP, at the origin. The RTLS infrastructure 37 is shown and could include various access points 38 as location sensors operative with processor 39, which locates and tracks assets (vehicles for example) as explained below and also process a predictive and rate metering.

Figure 2:
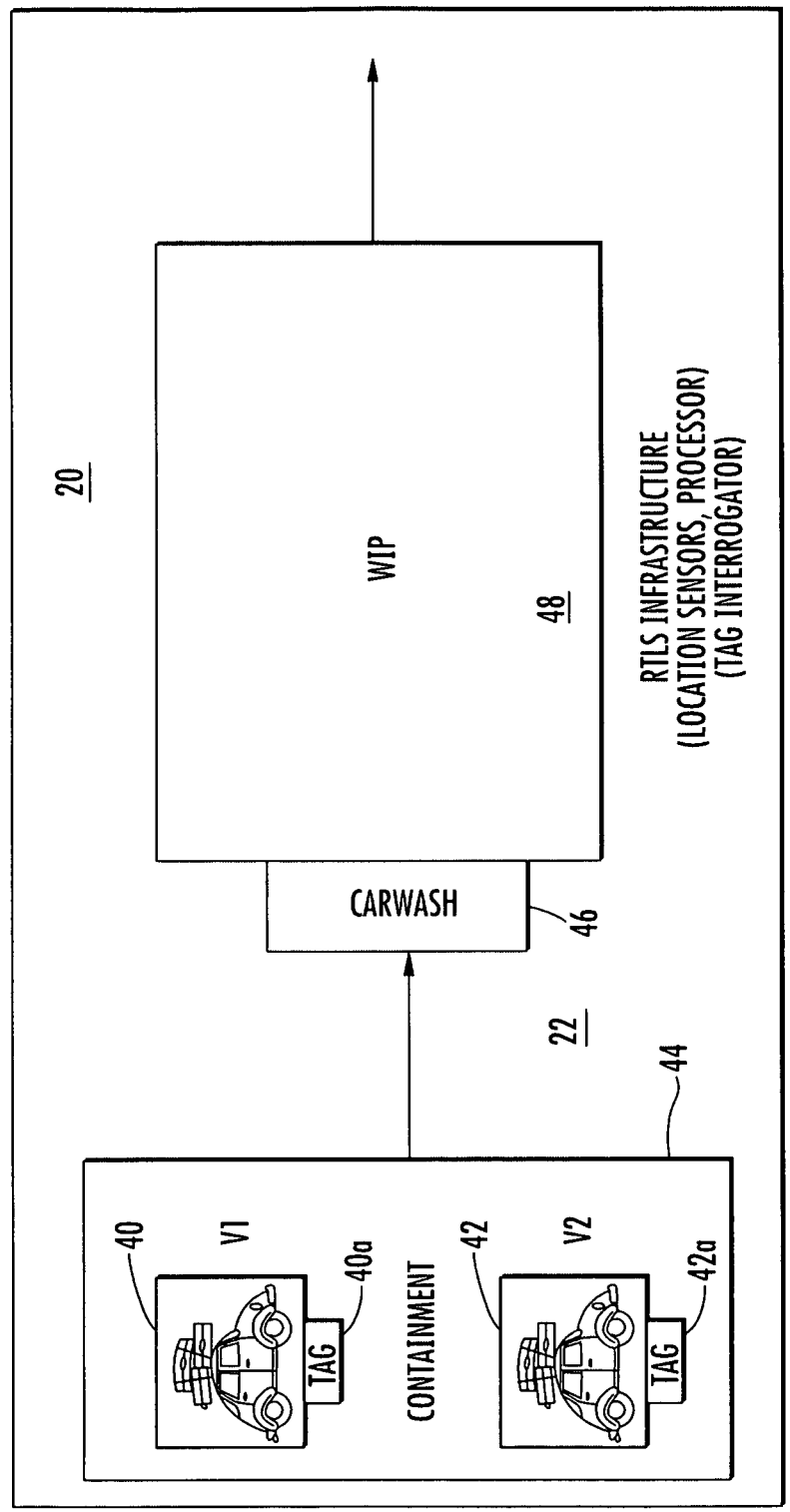
FIG. 2 is another block diagram showing a WIP and containment area with various vehicles in containment and illustrating whether different vehicles can make it through the work-in-progress (WIP) by the end of business in accordance with a non-limiting example.

FIG. 2 shows another block diagram of a manufacturing establishment 20 with vehicle post processing 22 in which two vehicles 40, 42 are shown in a containment area 44 and listed as vehicle 1 (40) and vehicle 2 (42). Decisions as to whether the vehicles 40, 42 continue into a processing area as a carwash 46 to be washed must be made. The vehicles entering and then exiting the car wash are WIP 48. Given all the remaining tasks for all vehicles already in WIP 48, the same system determines whether the first vehicle 40 can make it through WIP 48 and out by the end of perhaps the business day.

Figure 3:
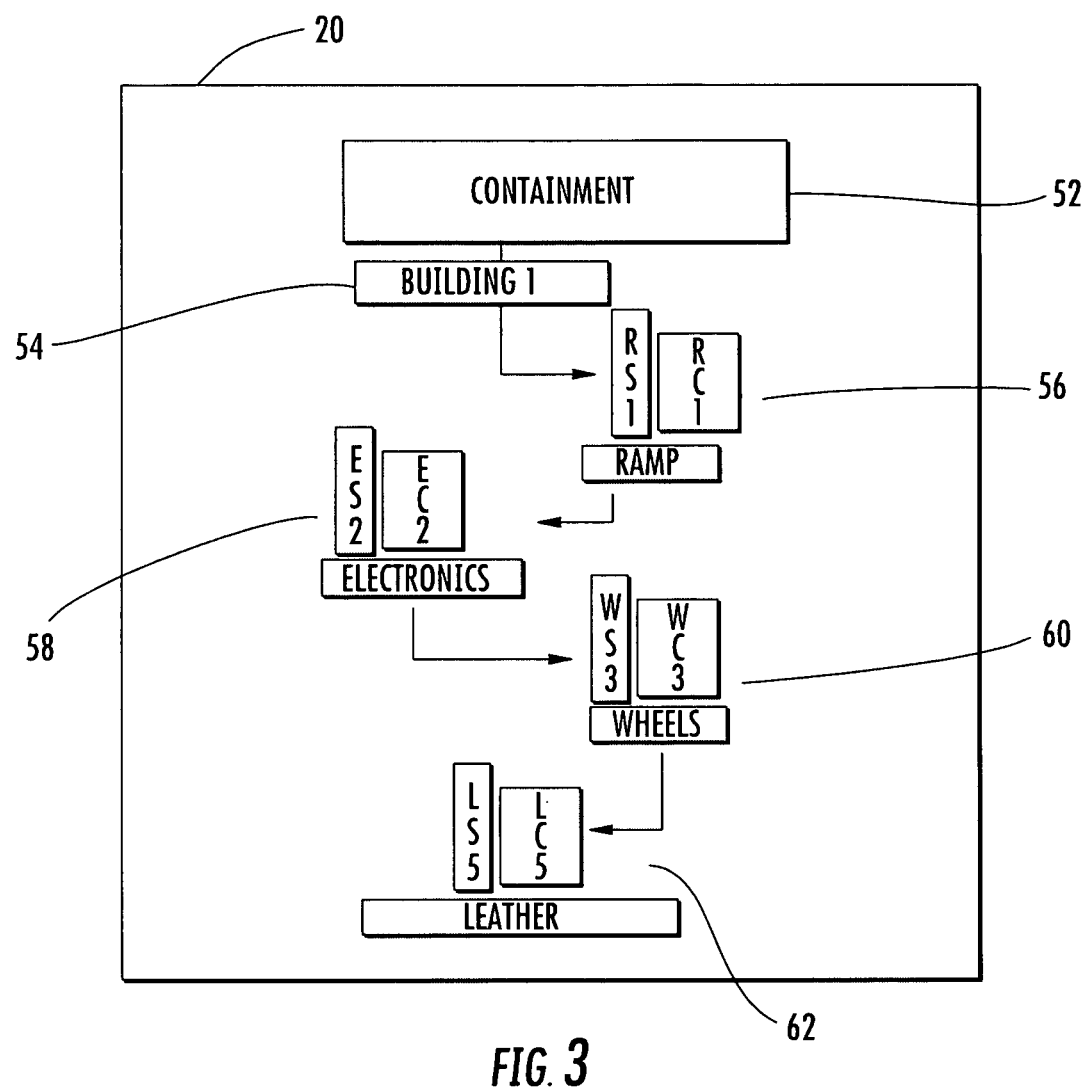
FIG. 3 is a block diagram showing various containment and staging areas in accordance with a non-limiting example.

A typical processing line that contains vehicles as WIP and included within a vehicle manufacturing establishment 20 is shown in FIG. 3, showing a basic containment 52 as part of a building 54. At a ramp staging (RS) 56, vehicles are "ramped" into the first stages of processing of this post assembly line, which includes electronic staging 58, wheels staging 60, and leather staging 62.

In accordance with a non-limiting example, either a predictive metering approach or rate metering approach as a non-limiting example can be used for asset or vehicle metering and flow optimization. Using the current WIP status, the system can look into the future of every process area and determine which will be visited by an allocated vehicle. An allocated vehicle typically has an RFID tag (or tag transmitter as sometimes referred) associated therewith, allowing a full spectrum of possible choices since the location of each vehicle is known. The rate metering approach can seek out problem areas in real-time and hold back vehicles going to those areas based on overflow rates. The problem areas are targeted typically in a rate approach. The system using a rate metering approach can determine which vehicles have priority, such that allocated vehicles could be the oldest to the allocated day with a date weight and various tasks enabled. Within that pool corresponding to the WIP, the system can determine if there are additional weight criteria for metering and flow optimization.

Figure 4:
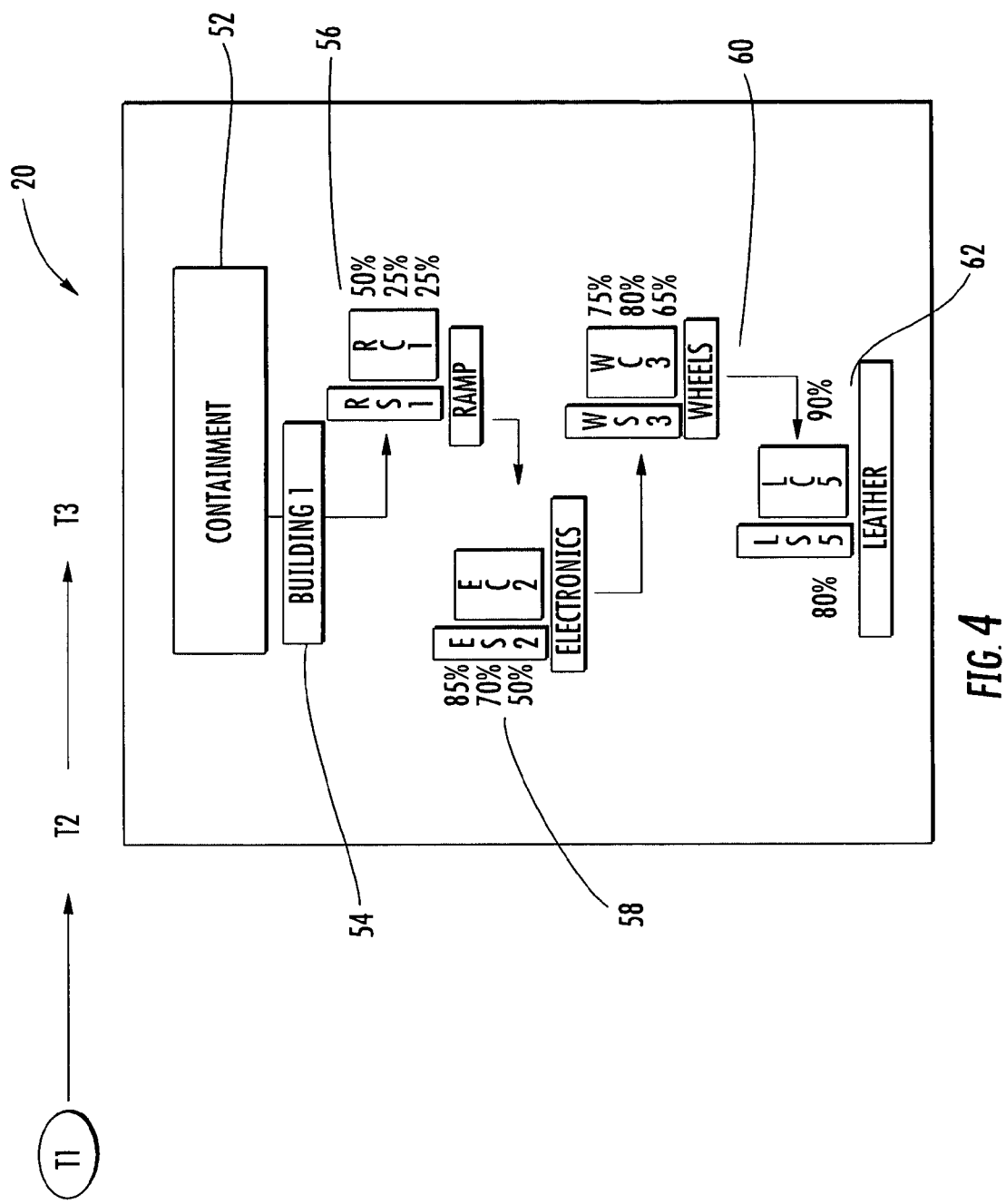
FIG. 4 is a block diagram showing a manufacturing establishment and WIP with an example of predictive metering in accordance with a non-limiting example.

FIG. 4 shows a manufacturing establishment 20 similar to that manufacturing environment shown in FIG. 3. In this example, predictive metering with associated percentages are applied at the ramp staging 56, the electronics staging 58, the wheels staging 60, and the leather staging 62. In predictive metering, the Estimated Time of Arrival (ETA) for a candidate vehicle such as Vehicle 1 (V1) 40 shown in FIG. 2 to each processing task area as per a task plan can be based on the estimated task duration and average move completion time. For each arrival time (TM) for V1 40, the system determines if there will be availability in that particular staging area or processing task area, such as the various car processing and staging areas shown in FIGS. 1-4 as an example. An available capacity at various areas is predictive, and the system determines what is about to come and what is about to go. Supplied by current, remaining tasks of WIP vehicles throughout the manufacturing establishment 20 in these examples and the current capacity of areas such as processing, staging, and containment, the ETA for each vehicle in WIP for a given processing area depends on current, remaining tasks. The Estimated Time of Departure (ETD) from a staging area depends on task completion or move completion of vehicles in a "bay." There could be some factors that affect the travel time, which can be calculated based on historical move completion between two processing areas.

Figure 5:
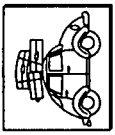
FIG. 5 is a table showing an implementation for different staging areas in accordance with a non-limiting example.

FIG. 5 shows an example table for each staging area and bay as shown in the example at FIG. 4 in a ten thousand (10,000) foot processing or assembly line implementation. Rate control metering is possible. The system will seek out problem areas and identify the number of vehicles as part of WIP waiting in staging and containment for every processing task area. The tag transmitter associated with each vehicle allows RTLS tracking of vehicles such that known location of vehicles can be accounted always on a real-time basis. The system defines minimum and maximum thresholds for each staging and containment area, and solicits whether the thresholds should be for staging, containment, or both. If a number of vehicles cross thresholds, then those particular areas are considered "problem areas." It should be understood that the system treats both the overflows and underflows as important.

There is a delay input that can be factored. For problem areas, P, the system checks if the candidate vehicle's (V1) task plan includes a visit to the problem area. This can be calculated as a rate of task completion (R) or move completion from the process task area associated with the problem area at staging and containment. The system calculates the number of vehicles (N) in overflow and how long it will take to move them out of overflow such that overflow time flow O=N/R. Vehicle 1 (V1) is moved into WIP at a current time plus the Minutes-to-Arrive (V1, P) minus O.

Figure 6:
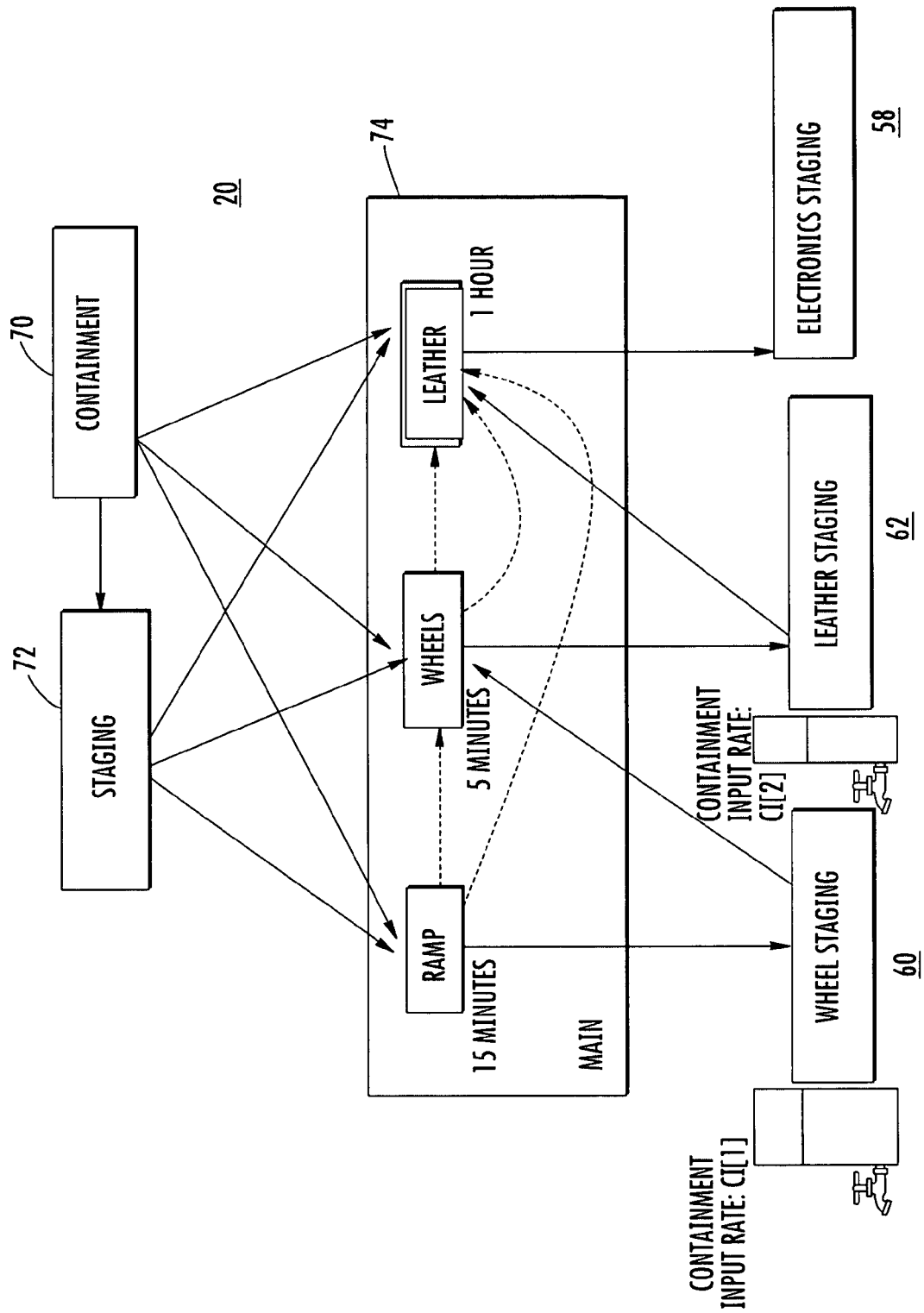
FIG. 6 is another block diagram showing different containment and staging areas for rate control metering in accordance with a non-limiting example.

FIG. 6 is a block diagram of part of the manufacturing establishment 20 and showing the interrelation among containment 70 to staging 72 or into a main work area 74. The various flow and minutes as an example among ramp staging, wheels staging, leather staging, and electronics staging are shown as logical examples.

Predictive metering typically is comprehensive, conservative, and pro-active. It is a large system in terms of resources used, however, and predictions make assumptions about the future, which could be many hours ahead. Predictive metering requires reliable, pre-defined estimates of task duration. Predictive metering is typically also less real-time oriented and uses task execution data without information about breaks and shifts, and in some instances, can be error prone. Vehicle tracking using RTLS is used but much is based on logical assumptions.

Rate metering can be more sensitive to real-time throughput and uses the Real-Time Location System (RTLS) and task plans with fewer assumptions. Rate metering typically does not require shift information. It can be reactive and address problems without consideration of upcoming pressures on the problem areas from vehicles already in WIP.

Other features can model a manual KanBan process.

1. All vehicles should have a new attribute called "Expedite Destination" which represents those staging areas that are also pull queues.

2. When a pull queue has vacancy, then the system should run through a list of rules that explores specific staging/outbound/containment areas, in a configured order. Note: A risk of location inaccuracy affecting vacancy determination should be mitigated.

3. When a vehicle is found to meet the criteria of these rules, its "Expedite Destination" should be set to the staging area which had the vacancy. This evaluation does not generate a move request. Move requests are generated by standard rules that push vehicles based on capacity in the subsequent, inbound staging area.

4. Pull move requests can be created by demand further down the line. Therefore, until the vehicle satisfies this demand, all future move requests for the vehicle should be given higher priority than push requests for other vehicles. When rules for directed push are evaluated for vehicles in any given area based on capacity in the subsequent area, vehicles with a non-empty value for "Expedite Destination" should be evaluated first.

5. Delete "Expedite Destination" upon departure from the pull queue or upon a move hold. Provide history keeping for "Expedite Destination" assignment, removal and reassignment.

6. A vehicle is assigned the expedite destination when a pull queue has a vacancy. To select a vehicle in the upstream zones, the VTMS rules manager should include the current location and location group of vehicles as attributes for configuring rule criteria. A rule could be classified as assigning an "Expedite Destination" or reading a directed push move request.

7. The user will create a rule set with this new type of rules, ordered by precedence of upstream staging/containment areas. A rule set will be configured for each pull queue.

8. If no vehicle is found fulfilling a pull queue demand, a VTMS alert could be raised and also sent out as an event for data collection.

Supervisors will frequently generate manual move requests due to business decisions that must override automated/directed move priorities. A user interface is needed for customers to select multiple move requests and assign them the same priority. The customer mentioned "drag-n-drop" though the product should explore any low cost and/or easier to use alternatives.

There now follows a description in greater detail of a type of vehicle tracking and management solution (VTMS) that can be used with the asset (vehicle) metering described above and can have flow optimization applied in accordance with non-limiting examples of the present invention.

VTMS typically supports either repetitive or job-order manufacturing operations, and can focus on areas of the business and processes where units are "off-line." These off-line areas typically include post-assembly verification and test processes, as well as quality repair, containment and shipping zones. Off-line processes are frequently a forgotten segment of lean manufacturing, and VTMS drives efficiency and optimization in this area.

In VTMS, an RFID tracking tag is associated with and placed in each vehicle. This "tagging" usually occurs just before the vehicle enters the off-line processing areas but in accordance with non-limiting example, "tagging" can occur when a vehicle is partially assembled. Supported by a standardized ANSI 371.1 and IEEE 802.11 infrastructure, the VTMS provides complete tracking of the vehicle as it moves through off-line and yard areas in this example.

By generating constant location data for each vehicle, the solution provides real-time location tracking and a historical record of the vehicle's progress through off-line certification, repair and containment areas. Beyond the obvious ability to locate a unit on demand, the tracking data can also be used to monitor such things as adherence to process, process cycle time, and dwell time analysis for off-line areas. Typically, VTMS is integrated with a company's quality management system, introducing the ability to plan, execute and monitor processing within the dynamic off-line environment.

VTMS allows inventory management and containment, and effectively manages "hold" inventory. Typically, this includes managing the containment and processing of repair units, quality campaigns, new model units, and part shortages.

By extending the reach of existing quality management systems to incorporate unit location and tracking, VTMS can determine where a unit is at any point in the process. VTMS provides constant visibility of every unit on site and includes a historical record of where each unit has been. VTMS prevents units with quality "hold" status from shipping.

VTMS creates data autonomously. As units move through different processes, the system automatically records such information as arrival, swell and departure without human intervention. This data collected by VTMS can be fed to other business support systems, enabling capture of an accurate accounting of the manufacturing process.

The system is advantageous in work planning. Those responsible for processing areas often have a difficult time determining the location, availability, and priority of units requiring work, for example vehicles. While Quality Control (QC) or manufacturing execution systems often contain an accurate record of which units require processing, they can lack critical information, i.e., the location and availability of each unit. The result is inefficient and inaccurate planning encumbered by lengthy inventory and search processes.

Planning tools can support vehicle processing. VTMS combines data from existing QC and manufacturing systems, unit location and availability, and applies pre-specified business rules to create accurate, dynamic work plans for each processing area.

With VTMS, workers are directed to process the most appropriate unit based on business rules, the unit's location, and its availability. By virtually eliminating search time and directing workers to process the most appropriate unit, the total cycle time for processing areas is significantly reduced.

VTMS provides accurate, real-time and historical representation of many key performance indicators of a unit processing. Examples of the types of data created autonomously within VTMS include the average vehicle processing time, the available beginning vehicle inventory, the vehicles processed by zone, the dwell time, and process adherence.

Because VTMS focuses on these dynamic off-line areas, and provides complete visibility of the location and status of all inventories, the system directly impacts order-to-delivery (OTD) performance and average work-in-process inventories. VTMS monitors and measures the dwell-time performance of different processing areas such that system bottlenecks can be identified and processes can be continuously improved.

By incorporating business rules and system alerts based on a customer order status and dwell time, VTMS can eliminate many issues from major concern. A logical hierarchy of rules manages the processing of a vehicle unit, and users typically do not deviate from the proper sequence without overriding the system and generating an exception report. By using the VTMS tools, companies can increase delivery performance and reduce the average WIP inventory for off-line areas.

Vehicle assembly, delivery chain, and fleet operations benefit with VTMS by improving key performance indicators (KPI) such as a) increasing vehicle throughput in offline and yard processes, b) increasing labor productivity in offline and yard processes, c) reducing dwell time of vehicle inventories in offline and yard areas, d) improving a first time process quality performance in a vehicle, and e) improving vehicle launch processes by improving vehicle inventory reporting, value is enhanced by a) reducing operating costs in all segments, b) increasing profitability per vehicle in all segments, c) reducing order-to-delivery time in vehicle assembly and delivery chain operations, d) improving customer satisfaction in all segments, e) increasing vehicle utilization in fleet operations, and f) reducing labor cost per vehicle.

The VTMS leverages various standards based technologies combined with domain specific applications to create a turn key solution that can be fully implemented within 30 to 90 days.

VTMS includes vehicle tracking and is operable for various communication infrastructures. Vehicle tracking leverages the ANSI 374.1, 3, 4 RTLS standards and work-force communication leverages IEEE 802.11b and g WiFi standards (Cisco, Symbol, Intermec). The system uses an active tracking tag, a vehicle event management device, the VTMS application, visibility software suite (VSS) application, for example, as sold by WhereNet Corporation, and a Microsoft Windows mobile terminal for WiFi compatible devices.

VTMS vehicle tracking capabilities allows a vehicle manufacturer, delivery chain, or fleet operation to know in real-time and with historically accurate data exactly where the vehicle is located or has been located, with accuracy to within 3 meters. The tracking technology uses a tag transmitter (active tracking pendant) that is associated with a specific vehicle in a campus that has deployed the vehicle tracking and work force communication infrastructure (e.g., a manufacturing establishment). In addition, software applications work with the tags and infrastructure and determine the exact x/y coordinates within the establishment regardless if a vehicle (as the particular tracked unit) is indoors or outdoors. The VTMS communicates the physical location of vehicles either by zone, parking slot, and/or intelligent interactive graphical mapping in one non-limiting example.

If an IEEE 802.11 infrastructure exists, VTMS can co-exist and leverage the existing IEEE 802.11 environment combined with a location sensor (LOS) infrastructure such as manufactured by WhereNet Corporation.

VTMS vehicle event management capabilities allows a vehicle manufacturer, delivery chain, or fleet operation to automate vehicle status changes, reduce labor intensive barcode scanning, and trigger transactions with zero human intervention. The event management technology combines vehicle location with process steps to effectively manage events. A vehicle event management device such as a tag interrogator is a proximity communication device that is used to trigger a tag transmitter to alternately "blink."

Various management functions of VTMS allows a vehicle manufacturer, delivery chain or fleet operation to automate the vehicle's process metrics gathering and reporting and ensures process verification. VTMS provides a business rules engine and a user defined alerting engine that, after proper configuration, ensures that a vehicle's path through processing is monitored, measured, verified, and reported on when deviations are determined. Metrics gathering can be automated and reporting on "process steps" reported, like cycle time measuring.

Vehicle throughput through offline and yard areas can be optimized. VTMS provides an active throughput management engine that directs the movement of vehicles through the offline and yard areas. By creating a process map for every vehicle, knowing the current inventory location, deducing the "process step" or "containment area" capacity, and the FIFO ordering of vehicles, the throughput management engine actively manages and optimizes the vehicle movement. VTMS communicates this information with users via desktop computers, Windows mobile terminal WiFi devices, production control boards, and video terminal kiosks.

VTMS exception based management capabilities allow a vehicle manufacturer, delivery chain, or fleet operations to set goals and have the system actively provide exception-based information to the user community prior or in real-time to provide maximum issue resolution time, increasing options and reducing costs. The exception management rules engine allows users to see exceptions for a vehicle as well as for a "process step." A VTMS "Dashboard" user interface or Windows Mobile Terminal interfaces enables users a "quick snapshot" with "stop lighting" to easily determine issues. The VTMS alerting engine reaches out to actively notify user of critical issues.

It should be understood that the term tag transmitter includes the transceiver functions of tags as explained relative to commonly assigned U.S. Pat. No. 6,853,687, the disclosure which is hereby incorporated by reference in its entirety.

A tag transmitter can be attached to the vehicle and transmit a continuous and repetitive, data packet stream of vehicle ID information via a RF signal. On FIG. 2 vehicles 40, 42, the tag transmitter for each vehicle is shown at 40a and 40b. The vehicle tag can incorporate standard technology found in a WhereNet tag transmitters manufactured by WhereNet Corporation in Santa Clara, Calif. Examples are disclosed in the commonly assigned and incorporated by reference U.S. Pat. Nos. or U.S. published applications: U.S. Pat. Nos. 5,920,287; 5,995,046; 6,121,926; 6,127,976; 6,268,723; 6,317,082; 6,380,894; 6,434,194; 6,476,719; 6,502,005; 6,593,885; 6,853,687; 2002/0094012; 2002/0104879; and 2002/0135479, the disclosures which are hereby incorporated by reference in their entirety.

The vehicle tag transmitter can be operative similar to the tag as described in the above-identified issued patents and published patent applications. It can include a state machine to make the tag operative at different states. Throughout this description, it should be understood that the terms tag transmitter and tag are used interchangeably. The vehicle tag can transmit or "blink" a short duration, wideband (spread spectrum) pulse of RF energy encoded with identifying information about the specific vehicle (or other WILP unit). The vehicle tag can include an oscillator, whose output is fed to a first "slow" pseudorandom pulse generator and to a strobe pulse generator or other circuitry as described in the incorporated by reference patents. It can include a timer and delay circuit and receiver circuitry. A high speed PN spreading sequence generator can be included with a crystal oscillator that provides a reference frequency for a phase locked loop (PLL) to establish a prescribed output frequency, for example, at 2.4 GHz. A mixer and output can be included with a vehicle tag memory that can include a database containing various vehicle parameters.

The vehicle tag could include a microcontroller, an on-board diagnostic connector (tag connector), and at least one transceiver. A more simple tag transmitter could be used, of course. Basic components of a vehicle tag that could be used are shown in commonly assigned U.S. Patent Publication No. 2004/0249557, the disclosure which is hereby incorporated by reference in its entirety.

The tag could include a housing base, a tag connector soldered to a printed circuit board and contained within the housing base, and a housing cover. The tag connector could be a J1962OBD-II compatible connector for connection to OBD-II systems, but other tag connectors could be used depending on vehicle and/or OBD designs in use. An LED could be indicative of vehicle tag and visible through an LED opening in the cover operation and is mounted to the printed circuit board. The printed circuit board could include a microcontroller and any necessary transceivers and associated components. The microcontroller could communicate to the vehicle through the connector into the vehicle OBD-II.

The vehicle tag could be derivative of the current WhereNet Wheretag III architecture as manufactured by WhereNet Corporation in Santa Clara, Calif. The vehicle tag could be a single assembly that contains the electronic components required for operation, including a vehicle bus interface, as a connector, the controller and transceiver as described before. The tag could support the querying of a vehicle data bus for vehicle identification and diagnostic information that could be transmitted for identification on location information. The vehicle tag could be used for buses conforming to the J1850 specification, but also could be compatible with the newly evolving CAN or other vehicle bus specifications.

The tag connector could be compatible preferably with the J-1962 vehicle diagnostic jack that is typically located under a vehicle dash. The software used for the vehicle tag can also be compatible with the Visibility Server Software Suite manufactured and sold by WhereNet Corporation, which is operable to accept, process, and forward data packets. A programming module can attach to a portable data terminal (PDT) to load vehicle parameters and firmware upgrades into the vehicle tag.

As to functionality, the RF components of the vehicle tag have the same functionality as a WhereTag III device that is part of the WhereNet Real-Time Locating System (RTLS) as explained in the incorporated by reference patents. The vehicle tag can operate in the globally accepted 2.4 GHz frequency band and transmit spread spectrum signals in excess of 300 meters outdoors, at less that 2 mW. It is operable with the Visibility Service Software that could be part of processor software modules, such as offered by WhereNet Corporation, as an integrated software package, that allows management of assets and resources as well as the WhereNet Real-Time Locating System.

The Visibility Service Software is a distributed Windows service that can include configuration tools, diagnostics, system alerts, an interface manager, and installation tools. This software package allows for e-mail and paging notifications. SNMP MIB definition extensions can be included, allowing the RTLS system to be managed as part of an enterprise standard IT infrastructure. A software launcher can provide single point of entry and software modules for operation, administration, diagnostics, installation and documentation. Any administration modules can provide tools to allow configuration of the RTLS system to meet testing requirements.

A proximity communication device or tag "interrogator" can be used in association with a vehicle tag, and can be a WherePort device, such as manufactured by WhereNet Corporation. This device is used to trigger vehicle tags and transmit different "blink" patterns or originate other functions as described before.

Also, a port device as an interrogator (either separate or as part of a locating access point) can include circuitry operative to generate a rotating magnetic or similar electromagnetic or other field such that the port device is operative as a proximity communication device that can trigger a tag transmitter to transmit an alternate (blink) pattern. The port device acts as an interrogator. Such an interrogator is described in commonly assigned U.S. Pat. No. 6,812,839, the disclosure which is incorporated by reference in its entirety. The tag interrogator could be positioned within the manufacturing establishment 20 and when vehicles enter specific containment, staging, and processing areas, a tag interrogator could activate the tag transmitted for the different blink rate or other functions. Such tags, port devices, and Access Points are commonly sold under the trade designation WhereTag, WherePort and WhereLan by Wherenet USA headquartered in Santa Clara, Calif.

The tag interrogator as a WherePort device can generate an AC magnetic field that rotates over a region of increased sensitivity in which an object, such as the tag, may enter. The tag interrogator is operative as a magnetic signal source and its emitted signals can carry identification data. Some data could be representative of information intended for the object entering the region. Of course the described embodiment of the object is a tag transmitter. The tag transmitter enters the region of increased sensitivity detecting the rotating AC magnetic field. The AC magnetic field can be generated as a plurality of respectively spatially and phase offset AC magnetic fields that form within the region a composite AC magnetic field that rotates over the region.

A distribution of spatially offset magnetic field generators can be proximate to the region and cause a distribution of spatially offset magnetic field generators to generate the phase offset AC magnetic fields and form within the region the composite AC magnetic field that rotates over the region. It can spatially provide complete magnetic field coverage for the region irrespective of the orientation of the tag transmitter. Frequency shift key and coding can be used for the rotating AC magnetic field. It can also be a non-modulated AC magnetic field.

A plurality of AC magnetic field generators can have a multi-dimensional arrangement of output field coils, axes which are non-parallel with one another and adapted to be driven with phase offset AC drive signals and produce the composite AC magnetic field that rotates over the region at the frequency of the AC drive signals.

The tag interrogator can be a proximity communication device that is used to trigger a tag transmitter to transmit an alternate "blink" pattern. When a tag transmitter passes through the interrogator's field, the tag can initiate a pre-programmed and (typically) faster blink rate to allow more location points as a tagged asset passes through a critical threshold. When the tag transmitter is sending interrogator-initiated blinks, the tag transmitter could include the identification number of the tag interrogator. More than 36,000 unique identification numbers are available in one non-limiting example.

The tag interrogator's field is nearly spherical and its range is adjustable from approximately 1 m (3 feet) to 6 m (20 feet) in some non-limiting examples. For especially large thresholds (such as very large dock doors) or areas where there may be signal blockage, multiple interrogators can be interconnected to provide a larger coverage area.

Designed for fixed indoor and outdoor applications, the interrogator is sealed against dust and water. Each interrogator typically includes an adjustable mounting bracket and requires only AC and DC power. There are no data cables to install. Another device, such as a portable wand, sold under the designation WhereWand, can be used for programming the interrogator and data entry.

The tag interrogator can have the following non-limiting specifications.

| ELECTRICAL | |
|---|---|
| Input Voltage | 24 VAC or 36 VDC |
| Power Dissipation | 4.2 w (max) |
| Operating Current | 250 mA (max) |
| Field Intensity Limits | 125 A/m at housing (ANSI/IEEE C 95.1) |
| | 51.5 dBuA/m at 10 m (ETSI) |
| Propagation Limits | 18.9 uV/m at 300 m (FCC) |

| TRIGGER RANGE | |
|---|---|
| The interragotor's effective range for a tag transmitter is configurable to one of eight levels. The following values assume voltage inputs of either 24 VAC or 36 VDC. | |
| Level | Effective Range |
| 8 | 4.5 to 6 m (15 to 20 ft) |
| 7 | 4 to 5 m (13 to 16 ft) |
| 6 | 2.5 to 3 m (8 to 10 ft) |
| 5 | 2.1 to 2.7 m (7 to 9 ft) |
| 4 | 1.8 to 2.5 m (6 to 8 ft) |
| 3 | 1.7 to 2.1 m (5.5 to 7 ft) |
| 2 | 1.5 to 1.8 m (5 to 6 ft) |
| 1 (low) | 1.1 to 1.2 m (3.5 to 4 ft) |

| ENVIRONMENTAL/PHYSICAL | |
|---|---|
| Operating Temperature Range | −30° C. to +60° C. (−22° F. to +140° F.) |
| Storage Temperature Range | −40° C. to +70° C. (−40° F. to +158° F.) |
| Humidity | 0-100% (non-condensing) |
| Diameter | 22.9 cm (9 in) |
| Depth | 12.7 cm (5 in) |
| Weight | 1 kg (2.25 lbs) |
| Environmental Sealing | IP65 (dust tight, water jets) |
| Case Material | Food-grade polyester blend |

The system as described provides a wireless infrastructure for locating a particular vehicle on which the tag mounting device is temporarily mounted for use in flow metering as described above. A real-time location system provides real-time ID and location of tags, and provides reliable telemetry to record transactions, and provides mobile communications to work instruction and data entry terminals. Any terminal operating (management) software (TOS) can be optimized by real-time location and telemetry data. The real-time location system is applicable for basic vehicle or asset inventory control.

The circuitry of a respective tag may be housed in a relatively compact, sealed transceiver module, which is sized to accommodate installation of a transceiver chip and one or more relatively long-life, flat-pack batteries and sensor devices. As a non-limiting example, the module may be rectangularly shaped, having a volume on the order of slightly more than one cubic inch, which allows the tag to be readily affixed to the temporary tag mounting device.

The general functional architecture of a tag can be formed as a transceiver (transmitter-transponder) unit. An example circuit is diagrammatically illustrated in FIG. 7A and the circuit components thereof are shown in detail in FIGS. 7B and 7C, such as disclosed in the incorporated by reference '687 patent.

Figure 7A:
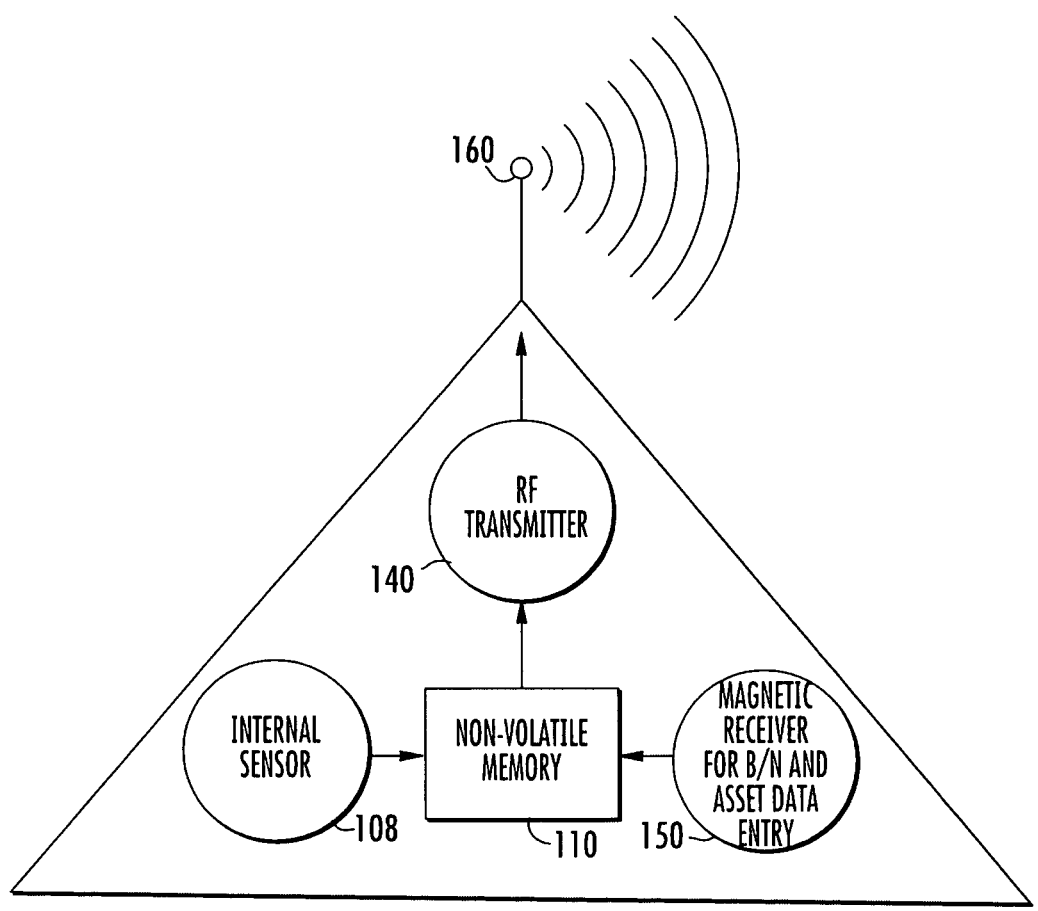
FIG. 7A is a general functional diagram of a tag transceiver that can be adapted for use in the system shown in FIGS. 1-6.

FIG. 7A is a general functional diagram of a tag transmitter as a tag transceiver that can be adapted for use in the system shown in FIGS. 1-6 as explained below. The tag transceiver (transmitter) includes an RF transmitter that is operable with a non-volatile memory 110, internal sensor 108, and magnetic receiver as a short range magnetic receiver 150, which requires a very insubstantial amount of power compared to other components of the tag. Because the receiver enabled pulse is very low power, it does not effectively effect the tag's battery life. As a relatively non-complex, low power device, the magnetic receiver is responsive to queries when the tag interrogator unit is relatively close to the tag (e.g., on the order of 10 to about 15 feet). This prevents an interrogator from stimulating responses from a large number of tags. Signal strength measurement circuitry within the tag interrogator or the tag may be used to provide an indication of the proximity of the query tag relative to the location of the interrogator, such as using RSSI circuitry within the interrogator and preferably within the tag as noted below. The tag includes an appropriate antenna 160.

Figure 7B:
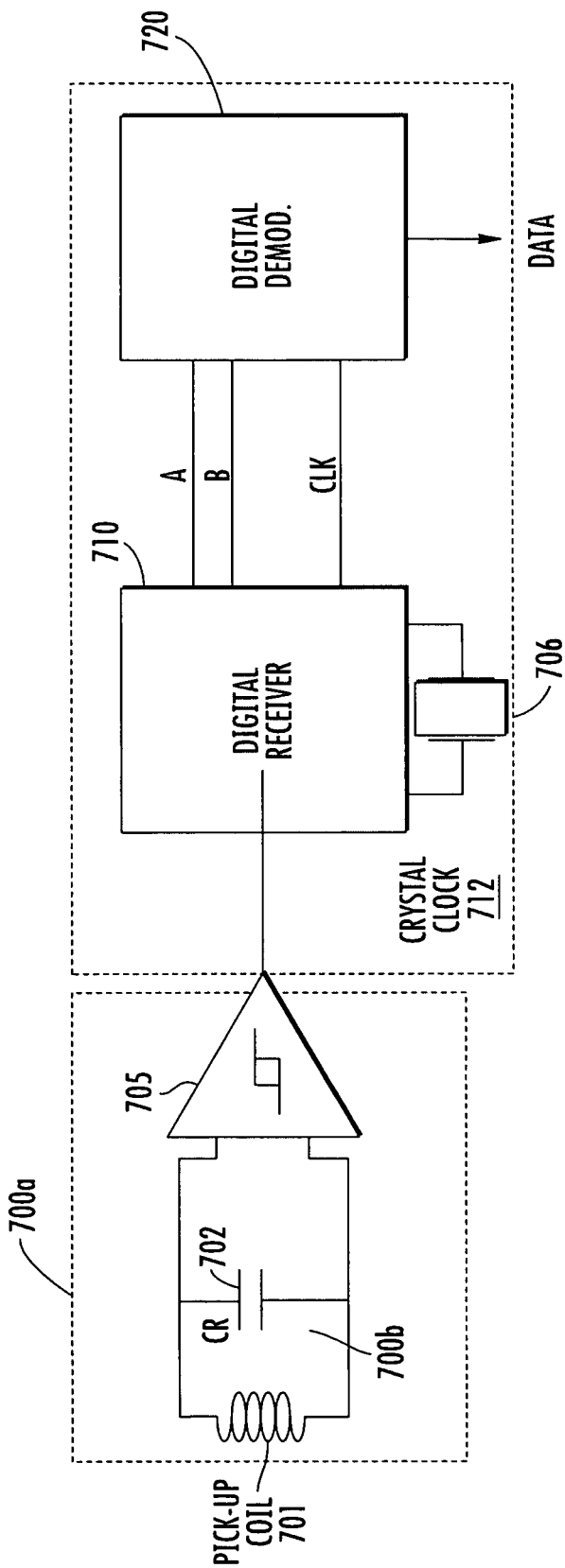
FIG. 7B is a circuit diagram showing a magnetic field receiver that can be used in accordance with a non-limiting example of the present invention.
Figure 7C:
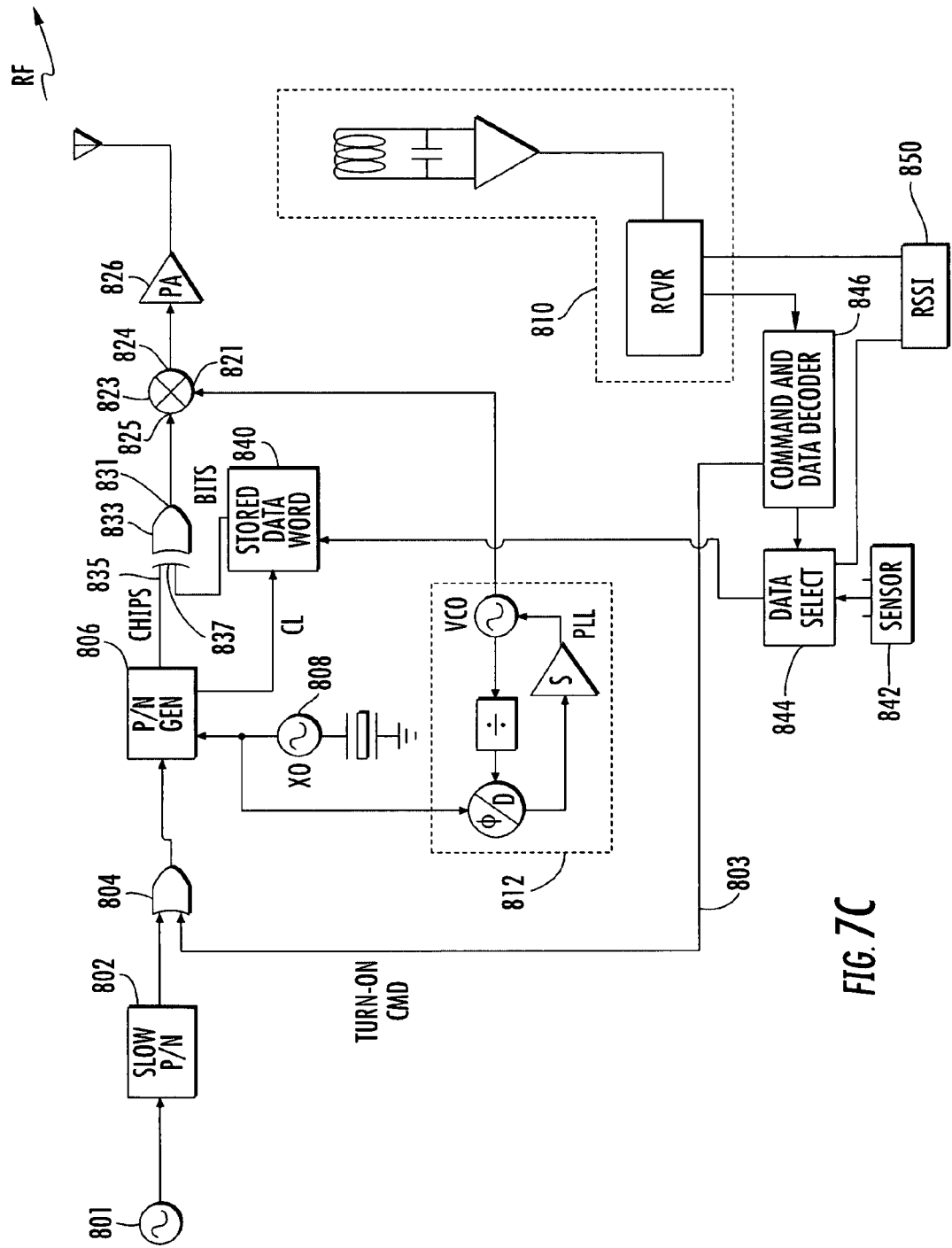
FIG. 7C is a schematic circuit diagram of an example of the circuit architecture of a tag transceiver as shown in FIG. 7A that is modified to incorporate a magnetic field receiver.

FIGS. 7B and 7C show circuits for a tag transmitter as described and using reference numerals in the 700 and 800 series.

FIG. 7B diagrammatically illustrates the configuration of a magnetic field sensing unit 700a for a respective tag and comprising a resonant (LC tank) detector circuit 700b having a magnetic field-sensing coil 701 coupled in parallel with a capacitor 702. The parameters of the tank circuit components are such that the tank circuit 700b resonates at a frequency between the two FSK frequencies employed by a FSK-modulating magnetic field generator of the tag interrogator. For the non-limiting example of using frequencies of F1=114.7 kHz and F2=147.5 kHz, referenced above, the tank circuit 700b may have a resonant frequency of 131 kHz.

The resonant tank circuit 700b is coupled to a sense amplifier 705, which amplifies the voltage produced by the tank sensor circuit for the desired receiver sensitivity and buffers the detected voltage to the appropriate logic level for use by a digital receiver—demodulator 706. The digital receiver—demodulator 706 includes a digital receiver 710, that is referenced to a crystal clock 712. For the present example, the receiver clock is set to a frequency that corresponds to the difference between the FSK frequencies of the selected modulation pair F1/F2. Thus, for the current example of employing transmitter frequencies of 114.7 kHz and 147.5 kHz, the receiver clock may be set at 32.8 kHz. This reduced clock frequency serves maintains very low power consumption at low cost. The use of such a relatively low reference frequency in the receiver requires a slower data rate, since one clock cycle of the receiver clock represents only 3.4-3.8 FSK clock cycles.

As described in the incorporated by reference '719 patent, the digital receiver 712 may employ complementary buffer paths A/B that operate on alternate sample periods one-half the period of the received data spread code. This ensures that at least one of the two buffer paths will not be sampling data during transitions in the received FSK frequency. The receiver integration time is sufficiently long to count the number of rising edges in a received FSK signal, and readily differentiate between the two valid FSK frequencies (here, F1=114.7 kHz and F2=147.5 kHz), to determine when a frequency change occurs, and to reject other FSK signals and/or noise.

The digital demodulator 720 contains a state machine that demodulates the data by comparing a received sequence of FSK tones with a predefined start-of-message sequence (corresponding to a start synchronization code). As a non-limiting example, the start-of-message sequence may comprise a plurality of successive samples at one FSK frequency or tone (such as three symbol periods at the higher of the two FSK tones), followed by a plurality of successive samples at the second FSK frequency (e.g., three symbol periods at the lower of the two FSK tones). Upon detecting this sequence, the state machine initializes the data demodulation circuitry, so that the data may be clocked out as it is detected and demodulated.

As is customary in FSK-based modulation systems, data values of '1' and '0' are represented by respectively difference sequences of the two FSK tones. As a non-limiting example, a logical 'one' may correspond to one symbol period at the higher FSK tone (147.5 KhZ) followed by one spreading chip period at the lower FSK tone (114.7 kHz); a logical 'zero' may correspond to one symbol period at the lower FSK tone (114.7 kHz), followed by one symbol period at the higher FSK tone (147.5 KhZ). Similar to detecting the start of a message, the demodulator's state machine may detect the end of a message by comparing a received sequence of FSK tones with a predefined end-of-message sequence. As a non-limiting example, the end-of-message sequence may be complementary to the start-of-message sequence, described above.

In an alternative embodiment the receiver may employ a phase detector a quadrature phase shift circuit resonant at the center of the two FSK tones. This alternative embodiment eliminates the requirement for a large spectral separation between the tones, so as to allow a narrower receiver bandwidth with better sensitivity and reduced susceptibility to interference. For example, the higher FSK tone may be reduced to 127 KHz, while still using the efficient 32.8 KHz system clock.

FIG. 7C shows the manner in which the circuit architecture of a tag transceiver (transmitter—transponder) unit employed in the radio location and tracking system of the type detailed in the above-referenced '719 patent (such as that shown in FIG. 4 of U.S. Pat. No. 5,920,287) may be modified to incorporate an encoded magnetic field receiver, such as that disclosed in the '719 patent and described above with reference to FIG. 7C. As shown in FIG. 7C, the augmented tag transceiver comprises an oscillator 801, the output of which is coupled to a variable pseudo random (PN) pulse generator 802.

The PN generator 802 is normally operative to generate series of relatively low repetition rate (for example, from tens of seconds to several hours), randomly occurring 'blink' pulses that are coupled through an OR gate 804 to a high speed PN spreading sequence generator 806. These blink pulses define when the tag randomly transmits or 'blinks' bursts of wideband (spread spectrum) RF energy to be detected by the tag transmission readers also termed in some instances as location sensors, in order to locate and identify the tag using time-of-arrival geometry processing of the identified first-to-arrive signals in one non-limiting example. The PN generator 802 is also coupled to receive a control signal on line 803 from magnetic field sensing circuitry of the type shown in FIG. 6E, and depicted generally in broken lines 810.

In response to the tag's magnetic field sensing circuitry demodulating a blink rate reprogramming message, FSK-modulated onto the magnetic field generated by the magnetic field generator (pinger), it couples a blink rate change signal (e.g., changes the binary state of line 803 from its default, low blink rate representative level to a high blink rate logic level) to the variable PN generator 802. This increases the pulse rate at which 'blink' pulses are produced by generator and coupled through OR gate 804 to the high speed PN spreading sequence generator 806. As a consequence the tag blinks at an increased rate and thereby alert the tracking system of the proximity of the tagged object to an 'increased sensitivity' region where the magnetic field generator is installed.

In response to an enabling 'blink' pulse, the high speed PN spreading sequence generator 806 generates a prescribed spreading sequence of PN chips. The PN spreading sequence generator 806 is driven at the RF frequency output of a crystal oscillator 808. This crystal oscillator provides a reference frequency for a phase locked loop (PLL) 812, which establishes a prescribed output frequency (for example, a frequency of 2.4 GHz, to comply with FCC licensing rules). The RF output of PLL 812 is coupled to a first input 821 of a mixer 823, the output 424 of which is coupled to an RF power amplifier 826. Mixer 823 has a second input 825 coupled to the output 831 of a spreading sequence modulation exclusive-OR gate 833. A first input 835 of the exclusive-OR gate 831 is coupled to receive the PN spreading chip sequence generated by PN generator 806, A second input 837 of exclusive-OR gate 831 is coupled to receive the respective bits of data stored in a tag data storage memory 840, which are clocked out by the PN spreading sequence generator 806.

The tag memory 840 may comprise a relatively low power, electrically alterable CMOS memory circuit, which stores a multibit word or code representative of the identification of the tag. The tag memory 840 may also store additional parameter data, such as that provided by an associated sensor (e.g., a temperature sensor) 842 installed on or external to the tag, and coupled thereto by way of a data select logic circuit 844. The data select logic circuit 844 is further coupled to receive data transmitted to the tag by the FSK-modulated magnetic field generator, described above, and demodulated by the magnetic field sensing circuit 810. For this purpose the demodulated data is decoded by a command and data decoder 846. The data select logic circuit 844 may implemented in gate array logic and is operative to append any data it receives to that already stored in the tag memory 840. It may also selectively couple sensor data to memory, so that the tag will send only previously stored data. It may also selectively filter or modify data output by the command and data decoder 846.

When a magnetic field-modulated message from the magnetic field generator is detected by the receiver 810, the data in the decoded message is written into the tag memory 840, via the data select logic circuit 844. The command and data decoder 846 also couples a signal through OR gate 804 to the enable input of the PN generator 806, so that the tag's transmitter will immediately generate a response RF burst, in the same manner as it randomly and repeatedly 'blinks,' a PN spreading sequence transmission containing its identification code and any parameter data stored in memory 840, as described above. A RSSI circuit 850 is operative with the receiver as a magnetic field sensing circuit 810 to measure the received signal strength.

As will be appreciated from the foregoing description, the desire to communicate with or controllably modify the operation of a tag whose object comes within a prescribed region (e.g., passes through a passageway) of a monitored environment, is readily accomplished, by placing an arrangement of one or more relatively short range, magnetic field proximity-based, tag-programming 'pingers' at a respective location of the monitored environment that is proximate to the region through which a tag may pass. The pinger may be readily implemented and the tag transceiver augmented in accordance with the respective magnetic field generator and tag-installed magnetic field sensor architectures described in the above referenced '719 patent.

The tag transmitter can comply with ANSI 371.1 RTLS standard and can use a globally accepted 2.4 GHz frequency band, transmitting spread spectrum signals in accordance with the standard. The use of the spread spectrum technology can provide long-range communications in excess of 100 meters for read and a 300 meter locate range for outdoors. This can be accomplished with less than two milliwatts of power. Battery life can be as long as seven years depending upon the blink rate, which could be user configurable from as little as five seconds to as much as one hour. Any type of activation from an interrogator can be up to six meters. The power could be a battery such as an AA lithium thionyl chloride cell. In one aspect, the height is about 0.9 inches and a length of about 2.6 inches or with mounting tags such as used for mounting the tag transmitter on the tag support member about four inches. The width is about 1.7 to about 2 inches.

Figure 8:
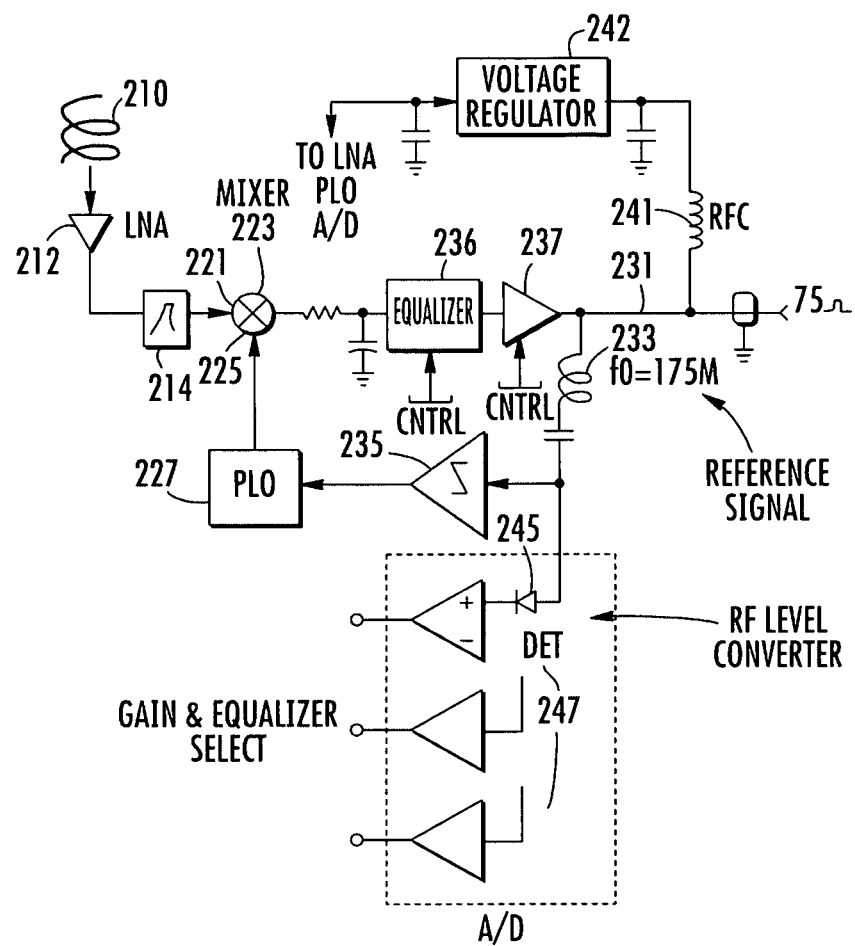
FIG. 8 is a high-level schematic circuit diagram showing basic components of an example of a circuit architecture that can be adapted for use as a receiver or access points operative with the tag transmitter and configured for use as a lane sensor.
Figure 9:
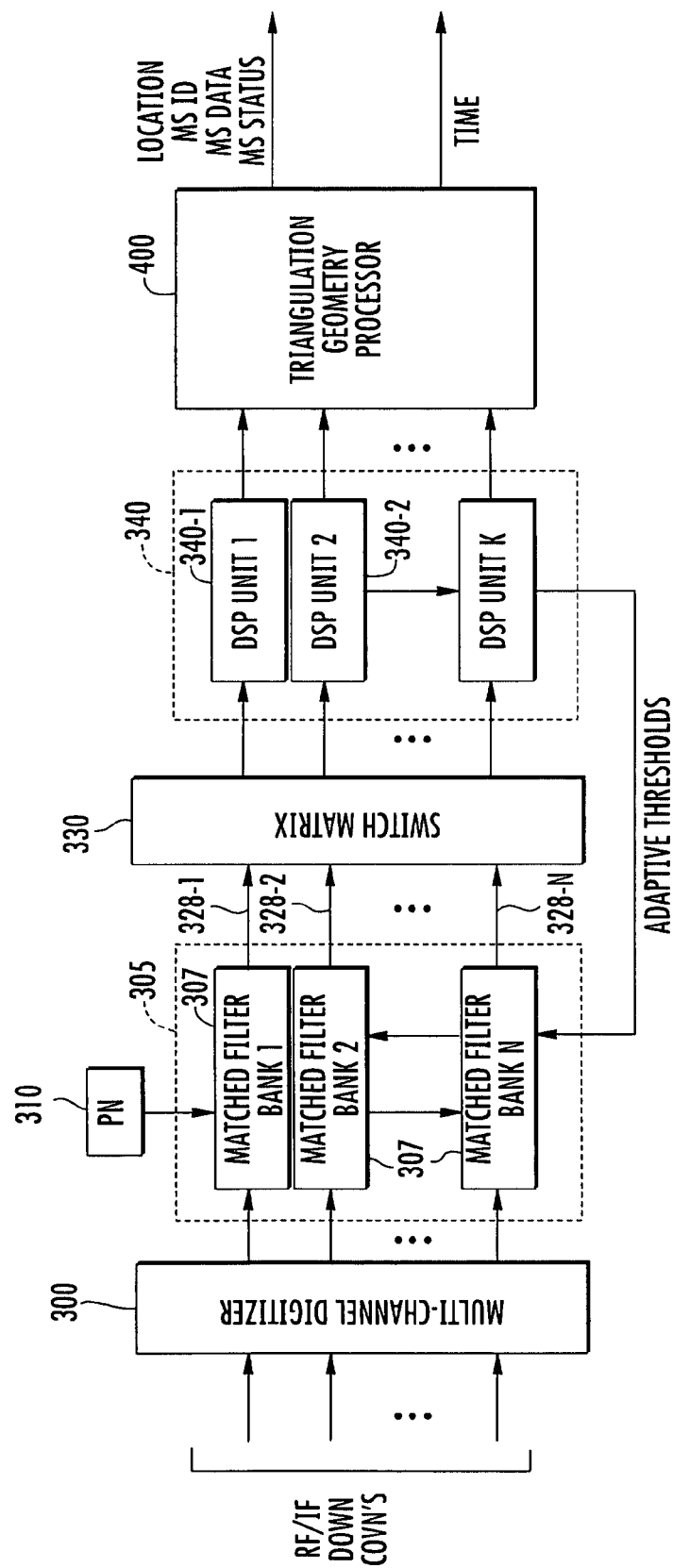
FIG. 9 is a schematic circuit diagram of an example of a circuit architecture that can be modified for use as a processor and operative with a lane sensor and tag transmitter.

FIGS. 8 and 9 represent examples of the type of circuits that can be used with modifications as suggested by those skilled in the art for receiver circuitry as a lane sensor, also operative as an access point such as location sensors and processor circuitry as part of a server or separate unit to determine any timing matters, validate rentals or returns, set up a correlation algorithm responsive to any timing matters, determine which tag signals are first-to-arrive signals and conduct differentiation of first-to-arrive signals to locate a tag or other transmitter generating a tag or comparable signal.

Naturally, a more simple processor design could be used if only vehicle identification for validation and controlling entry and exit from a vehicle lot is desired.

Referring now to FIGS. 8 and 9, a representative circuit and algorithm as described in the above mentioned and incorporated by reference patents are disclosed and set forth in the description below to aid in understanding the type of receiver or access point and location processor circuitry that can be used for determining which signals are first-to-arrive signals and how a processor conducts differentiation of the first-to-arrive signals to locate a tag transmitter.

FIG. 8 diagrammatically illustrates one type of circuitry configuration of a respective architecture for "reading" associated signals or a pulse (a "blink") used for location determination signals, such as signals emitted from a tag transmitter to a receiver as a locating access point. An antenna 210 senses appended transmission bursts or other signals from the object and tag transmitter to be located. The antenna could be omnidirectional and circularly polarized, and coupled to a power amplifier 212, whose output is filtered by a bandpass filter 214. Naturally, dual diversity antennae could be used or a single antenna. Respective I and Q channels of a bandpass filtered signal are processed in associated circuits corresponding to that coupled downstream of filter 214. To simplify the drawing only a single channel is shown.

A respective bandpass filtered I/Q channel is applied to a first input 221 of a down-converting mixer 223. Mixer 223 has a second input 225 coupled to receive the output of a phase-locked local IF oscillator 227. IF oscillator 227 is driven by a highly stable reference frequency signal (e.g., 175 MHz) coupled over a (75 ohm) communication cable 231 from a control processor. The reference frequency applied to phase-locked oscillator 227 is coupled through an LC filter 233 and limited via limiter 235.

The IF output of mixer 223, which may be on the order of 70 MHz, is coupled to a controlled equalizer 236, the output of which is applied through a controlled current amplifier 237 and preferably applied to communication cable 231 through a communication signal processor, which could be an associated processor. The communication cable 231 also supplies DC power for the various components of the access point by way of an RF choke 241 to a voltage regulator 242, which supplies the requisite DC voltage for powering an oscillator, power amplifier and analog-to-digital units of the receiver.

A 175 MHz reference frequency can be supplied by a communications control processor to the phase locked local oscillator 227 and its amplitude could imply the length of any communication cable 231 (if used). This magnitude information can be used as control inputs to equalizer 236 and current amplifier 237, so as to set gain and/or a desired value of equalization, that may be required to accommodate any length of any communication cables (if used). For this purpose, the magnitude of the reference frequency may be detected by a simple diode detector 245 and applied to respective inputs of a set of gain and equalization comparators shown at 247. The outputs of comparators are quantized to set the gain and/or equalization parameters.

It is possible that sometimes signals could be generated through the clocks used with the global positioning system receivers and/or other wireless signals. Such timing reference signals can be used as suggested by known skilled in the art.

FIG. 9 diagrammatically illustrates an example architecture of a correlation-based, RF signal processor circuit as part of a location processor to which the output of a respective RF/IF conversion circuit can be coupled such as by wireless communication (or wired in some instances) for processing the output and determining location based on the GPS receiver location information for various tag signal readers. The correlation-based RF signal processor correlates spread spectrum signals detected by an associated tag signal reader with successively delayed or offset in time (by a fraction of a chip) spread spectrum reference signal patterns, and determines which spread spectrum signal is the first-to-arrive corresponding to a location pulse.

Because each access point can be expected to receive multiple signals from the tag transmitter due to multipath effects caused by the signal transmitted by the tag transmitter being reflected off various objects/surfaces, the correlation scheme ensures identification of the first observable transmission, which is the only signal containing valid timing information from which a true determination can be made of the distance.

For this purpose, as shown in FIG. 9, the RF processor employs a front end, multichannel digitizer 300, such as a quadrature IF-baseband down-converter for each of an N number of receivers. The quadrature baseband signals are digitized by associated analog-to-digital converters (ADCs) 272I and 272Q. Digitizing (sampling) the outputs at baseband serves to minimize the sampling rate required for an individual channel, while also allowing a matched filter section 305, to which the respective channels (reader outputs) of the digitizer 300 are coupled to be implemented as a single, dedicated functionality ASIC, that is readily cascadable with other identical components to maximize performance and minimize cost.

This provides an advantage over bandpass filtering schemes, which require either higher sampling rates or more expensive analog-to-digital converters that are capable of directly sampling very high IF frequencies and large bandwidths. Implementing a bandpass filtering approach typically requires a second ASIC to provide an interface between the analog-to-digital converters and the correlators. In addition, baseband sampling requires only half the sampling rate per channel of bandpass filtering schemes.

The matched filter section 305 may contain a plurality of matched filter banks 307, each of which is comprised of a set of parallel correlators, such as described in the above identified, incorporated by reference '926 patent. A PN spreading code generator could produce a PN spreading code (identical to that produced by a PN spreading sequence generator of a tag transmitter). The PN spreading code produced by PN code generator is supplied to a first correlator unit and a series of delay units, outputs of which are coupled to respective ones of the remaining correlators. Each delay unit provides a delay equivalent to one-half a chip. Further details of the parallel correlation are found in the incorporated by reference '926 patent.

As a non-limiting example, the matched filter correlators may be sized and clocked to provide on the order of $4 \times 10^6$ correlations per epoch. By continuously correlating all possible phases of the PN spreading code with an incoming signal, the correlation processing architecture effectively functions as a matched filter, continuously looking for a match between the reference spreading code sequence and the contents of the incoming signal. Each correlation output port 328 is compared with a prescribed threshold that is adaptively established by a set of "on-demand" or "as needed" digital processing units 340-1, 340-2, . . . 340-K. One of the correlator outputs 328 has a summation value exceeding the threshold in which the delayed version of the PN spreading sequence is effectively aligned (to within half a chip time) with the incoming signal.

This signal is applied to a switching matrix 330, which is operative to couple a "snapshot" of the data on the selected channel to a selected digital signal processing unit 340-1 of the set of digital signal processing units 340. The units can "blink" or transmit location pulses randomly, and can be statistically quantified, and thus, the number of potential simultaneous signals over a processor revisit time could determine the number of such "on-demand" digital signal processors required.

A processor would scan the raw data supplied to the matched filter and the initial time tag. The raw data is scanned at fractions of a chip rate using a separate matched filter as a co-processor to produce an auto-correlation in both the forward (in time) and backwards (in time) directions around the initial detection output for both the earliest (first observable path) detection and other buried signals. The output of the digital processor is the first path detection time, threshold information, and the amount of energy in the signal produced at each receiver's input, which is supplied to and processed by the time-of-arrival-based multi-lateration processor section 400.

Processor section 400 could use a standard multi-lateration algorithm that relies upon time-of-arrival inputs from at least three readers to compute the location of the tag transmitter. The algorithm may be one which uses a weighted average of the received signals. In addition to using the first observable signals to determine object location, the processor also can read any data read out of a memory for the tag transmitter and superimposed on the transmission. Object position and parameter data can be downloaded to a database where object information is maintained. Any data stored in a tag memory may be augmented by altimetry data supplied from a relatively inexpensive, commercially available altimeter circuit. Further details of such circuit are found in the incorporated by reference '926 patent.

It is also possible to use an enhanced circuit as shown in the incorporated by reference '926 patent to reduce multi-path effects, by using dual antennae and providing spatial diversity-based mitigation of multipath signals. In such systems, the antennas are spaced apart from one another by a distance that is sufficient to minimize destructive multipath interference at both antennas simultaneously, and also ensure that the antennas are close enough to one another so as to not significantly affect the calculation of the location of the object by a downstream multi-lateration processor.

The multi-lateration algorithm executed by the location processor could be modified to include a front-end subroutine that selects the earlier-to-arrive outputs of each of the detectors as the value to be employed in a multi-lateration algorithm. A plurality of auxiliary "phased array" signal processing paths can be coupled to the antenna set (e.g., pair), in addition to any paths containing directly connected receivers and their associated first arrival detectors that feed the locator processor. Each respective auxiliary phased array path is configured to sum the energy received from the two antennas in a prescribed phase relationship, with the energy sum being coupled to associated units that feed a processor as a triangulation processor.

The purpose of a phased array modification is to address the situation in a multipath environment where a relatively "early" signal may be canceled by an equal and opposite signal arriving from a different direction. It is also possible to take advantage of an array factor of a plurality of antennas to provide a reasonable probability of effectively ignoring the destructively interfering energy. A phased array provides each site with the ability to differentiate between received signals, by using the "pattern" or spatial distribution of gain to receive one incoming signal and ignore the other.

The multi-lateration algorithm executed by the location processor could include a front end subroutine that selects the earliest-to-arrive output of its input signal processing paths and those from each of the signal processing paths as the value to be employed in the multi-lateration algorithm (for that receiver site). The number of elements and paths, and the gain and the phase shift values (weighting coefficients) may vary depending upon the application.

It is also possible to partition and distribute the processing load by using a distributed data processing architecture as described in the incorporated by reference '976 patent. This architecture can be configured to distribute the workload over a plurality of interconnected information handling and processing subsystems. Distributing the processing load enables fault tolerance through dynamic reallocation.

The front end processing subsystem can be partitioned into a plurality of detection processors, so that data processing operations are distributed among sets of processors. The partitioned processors are coupled in turn through distributed association processors to multiple location processors. For tag detection capability, each reader could be equipped with a low cost omnidirectional antenna, that provides hemispherical coverage within the monitored environment.

A detection processor filters received energy to determine the earliest time-of-arrival energy received for a transmission, and thereby minimize multi-path effects on the eventually determined location of a tag transmitter. The detection processor demodulates and time stamps all received energy that is correlated to known spreading codes of the transmission, so as to associate a received location pulse with only one tag transmitter. It then assembles this information into a message packet and transmits the packet as a detection report over a communication framework to one of the partitioned set of association processors, and then de-allocates the detection report.

A detection processor to association control processor flow control mechanism equitably distributes the computational load among the available association processors, while assuring that all receptions of a single location pulse transmission, whether they come from one or multiple detection processors, are directed to the same association processor.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for controlling throughput of a plurality of assets in a work-in-progress (WIP) flow within a monitored environment, comprising:
   a tag transmitter associated with each of the plurality of assets and configured to transmit a wireless radio frequency (RF) signal that includes data relating to the identification of the asset to which the tag transmitter is associated; and
   a real time location system (RTLS) infrastructure configured to track locations of the plurality of assets through task areas of the WIP flow within the monitored environment, the RTLS infrastructure comprising:
      a plurality of spaced access points positioned at known locations within the monitored environment, the access points being configured to receive the wireless RF signals from the tag transmitters, and
      one or more processors configured to:
         correlate the signals and successively delayed or offset versions of the signals received at the access points from the tag transmitters
         determine first-to-arrive signals from the correlated signals;
         locate the tag transmitters based on the first-to-arrive signals;
         determine, via flow metering of the assets and based on the located tag transmitters, an asset input rate into the WIP flow at an origin of the WIP flow;

calculate a delay input for completing a task in one of the task areas; and control, based on the delay input, throughput of the assets through the task areas.

2. The system according to claim 1, wherein the assets comprise vehicles, and the task areas within the monitored environment comprise a containment task area, a staging task area, and a processing task area through which the vehicles pass.

3. The system according to claim 1, wherein the RTLS infrastructure is configured to process RF signals including signals compatible with ISO 24730 and WiFi.

4. The system according to claim 1, wherein the one or more processors are configured to determine the asset input rate into the WIP flow based upon predictive metering that determines asset availability in the task areas including a staging task area and a processing task area.

5. The system according to claim 4, wherein the one or more processors are configured to estimate an estimated time of arrival (ETA) of an asset to the processing task area and determine whether there is task area availability within the staging task area or the processing task area.

6. The system according to claim 5, wherein the one or more processors are configured to estimate an estimated time of departure (ETD) for each asset from the staging area depending on task completion or move completion of assets.

7. The system according to claim 1, wherein the one or more processors are configured to determine the asset input rate into the WIP flow based upon rate metering that identifies a number of assets waiting in a staging task area and a containment task area for a processing task area to determine minimum and maximum thresholds for the staging task area and the containment task area and based upon an asset overflow in the WIP flow.

8. The system according to claim 7, wherein the one or more processors are configured to determine the delay input in response to a number of assets exceeding a threshold within the staging task area or the containment task area.

9. A system for controlling throughput of a plurality of assets in a work-in-progress (WIP) flow within a monitored environment comprising:
a tag transmitter associated with each of the plurality of assets and configured to transmit a wireless radio frequency (RF) signal that includes data relating to the identification of the asset to which the tag transmitter is associated; and
a real time location system (RTLS) infrastructure configured to track locations of the plurality of assets through task areas of the WIP flow within the monitored environment, the RTLS infrastructure comprising:
a plurality of spaced access points positioned at known locations within the monitored environment, the access points being configured to receive the wireless RF signals from the tag transmitters, and
one or more processors configured to:
correlate signals and successively delayed or offset versions of the signals received at the access points from the tag transmitters:
determine first-to-arrive signals from the correlated signals;
locate the tag transmitters based on the first-to-arrive signals;
determine, via flow metering of the assets and based on the located tag transmitters, an asset input rate into the WIP flow at an origin of the WIP flow;
calculate a delay input for completing a task in one of the task areas;

control throughput of the assets through the task areas based on the delay input and predictive metering that determines asset availability in a staging task area or a processing task area.

10. The system according to claim 9, wherein the assets comprise vehicles, and the task areas within the monitored environment comprise a containment task area, the staging task area, and the processing task area through which the vehicles pass.

11. The system according to claim 9, wherein the RTLS infrastructure is configured to process RF signals including signals compatible with ISO 24730 and WiFi.

12. The system according to claim 9, wherein the one or more processors are configured to estimate an estimated time or arrival (ET A) of an asset to the processing task area and determine whether there is task area availability within the staging task area or the processing task area.

13. The system according to claim 12, wherein the one or more processors are configured to estimate an estimated time of departure (ETD) for each asset from the staging task area depending on task completion or move completion of assets.

14. The system according to claim 12, wherein the one or more processors are configured to calculate the delay input in response to a number of assets exceeding thresholds within the staging task area or a containment task area.

15. A method for controlling throughput of a plurality of assets in a work-in-progress (WIIP) flow within a monitored environment, each asset associated with a respective tag transmitter, the method comprising:
transmitting a wireless radio frequency (RF) signal from each tag transmitter, associated with the respective asset to be tracked within a monitored environment, to a plurality of access points such that the RF signals include data relating to the identification of the respective asset, the access points being positioned at known locations within the monitored environment;
correlating the RF signals and successively delayed or offset versions of the RF signals received at the access points;
determining a first-to-arrive signal from the correlated signals;
determining a location of each tag transmitter based on the first-to-arrive signals;
tracking the location of the plurality of assets through various task areas of the WIP flow within the monitored environment using a real time location system (RTLS) and based on the determined location of the respective tag transmitters;
determining, using one or more processors, via flow metering of the assets using the RTLS and based on the determined location of the tag transmitters, an asset input rate of the plurality of assets into the WIP flow at an origin of the WIP flow;
calculating, using the one or more processors, a delay input for completing a task in one of the task areas;
controlling, using the one or more processors and based on the delay input, an asset flow rate of the plurality of assets through the task areas of the WIP flow within the monitored environment.

16. The method according to claim 15, further comprising tracking the assets as vehicles through the task areas within the monitored environment, the task areas including a containment task area, a staging task area, and a processing task area.

17. The method according to claim 15, further comprising determining the asset input rate into the WIP flow based upon predictive metering that determines asset availability in the task areas including a staging task are and a processing task area.

18. The method according to claim 17, further comprising estimating an estimated time of arrival (ETA) of an asset of the plurality of assets to the processing task area and determining whether there is task area availability within the staging task area or the processing task area and estimating an estimated time of departure (ETD) for each asset of the plurality of assets from the staging task area depending on task completion or move completion of assets.

19. The method according to claim 15, further comprising determining the asset input rate into the WIP flow based upon rate control metering that identifies a number of assets waiting in a staging task area and a containment task area for a processing task area to determine minimum and maximum thresholds for the staging task area and the containment task area and based upon an asset overflow in the WIP flow.

20. The method according to claim 15, wherein the determining of the delay input is performed in response to a number of assets exceeding a threshold within a staging task area or a containment task area.

* * * * *